(12) United States Patent
Rolfe

(10) Patent No.: US 11,282,366 B2
(45) Date of Patent: Mar. 22, 2022

(54) MONITORING SYSTEM FOR THE PREVENTION OF MISTREATMENT OF A PERSON IN CARE

(71) Applicant: Ashley Rolfe, Essex (GB)

(72) Inventor: Ashley Rolfe, Essex (GB)

( * ) Notice: Subject to any disclaimer, the term of this patent is extended or adjusted under 35 U.S.C. 154(b) by 0 days.

(21) Appl. No.: 17/034,158

(22) Filed: Sep. 28, 2020

(65) Prior Publication Data
US 2021/0125482 A1     Apr. 29, 2021

(30) Foreign Application Priority Data

Oct. 28, 2019  (GB) ..................................... 1915621
Jan. 21, 2020  (GB) ..................................... 2000891

(51) Int. Cl.
| | | |
|---|---|---|
| G08B 21/04 | (2006.01) |
| H04W 4/80 | (2018.01) |
| G08B 25/01 | (2006.01) |
| G08B 21/02 | (2006.01) |

(52) U.S. Cl.
CPC ......... *G08B 21/0469* (2013.01); *G08B 21/02* (2013.01); *G08B 21/043* (2013.01); *G08B 21/0446* (2013.01); *G08B 21/0476* (2013.01); *G08B 25/016* (2013.01); *H04W 4/80* (2018.02)

(58) Field of Classification Search
CPC ............ G08B 21/0469; G08B 21/0446; G08B 21/0476; G08B 25/016; G08B 21/043; G08B 21/02; H04W 4/80
USPC ......................................................... 340/573.1
See application file for complete search history.

(56) References Cited

U.S. PATENT DOCUMENTS

| | | | | |
|---|---|---|---|---|
| 7,733,224 | B2 * | 6/2010 | Tran ......................... | A61B 7/04 340/540 |
| 10,096,234 | B1 * | 10/2018 | Chun ...................... | G10L 15/08 |
| 10,950,226 | B2 * | 3/2021 | Harper ................ | G10L 15/1815 |
| 2020/0233974 | A1 * | 7/2020 | Miron ..................... | H04L 51/12 |
| 2021/0005069 | A1 * | 1/2021 | Mangai ................... | G10L 15/08 |

FOREIGN PATENT DOCUMENTS

| | | |
|---|---|---|
| CN | 108416979 A | 8/2018 |
| GB | 2534919 A | 10/2017 |
| GB | 2539883 A | 5/2019 |
| KR | 1020100058272 A | 6/2010 |
| KR | 1020160028785 A | 3/2016 |
| KR | 1020160136631 A | 11/2016 |

\* cited by examiner

*Primary Examiner* — John A Tweel, Jr.
(74) *Attorney, Agent, or Firm* — Rumit Ranjit Kanakia

(57) ABSTRACT

The present invention relates to a system for preventing mistreatment of a person in care. In particular a mistreatment sensor worn by a person in care wirelessly linked to an audio and video recording device.

12 Claims, 4 Drawing Sheets

MONITORING SYSTEM FOR THE PREVENTION OF MISTREATMENT OF A PERSON IN CARE

The present invention relates to a system for preventing mistreatment of a person in care. In particular a mistreatment sensor worn by a person in care wirelessly linked to an audio and video recording device.

BACKGROUND OF THE INVENTION

There are a large number of people in the world who for many different reasons are vulnerable and not capable of fully looking after themselves. They require assistance and care to varying degrees. Some only need a visit once or twice a week to their own home, while others need around the clock supervision at specialist locations. To provide this care many employ care service providers.

However, over the past years there have been a number of reports detailing mistreatment or abuse of vulnerable individuals by those employed to care for them. This is greatly upsetting and a source of huge worry to those whose loved ones require care.

A solution is sought to help guarantee and provide peace of mind that a vulnerable loved one is not being mistreated or abused by the person employed to care for them and indeed if the worst does occur and the vulnerable individual is abused, immediately notify and provide proof to an interested party so they can take appropriate action to stop the mistreatment or abuse and prevent it from happening again.

STATEMENT OF INVENTION

An aspect of the invention provides a monitoring system for gathering evidence of and generating an alert to the mistreatment of a person in care. The system comprises a wearable device worn by a user comprising sensors to detect signals indicative of possible mistreatment of the user, including a microphone. It also comprises a hub device wirelessly connected to the wearable device and with access to an independent network. The hub further comprises means for monitoring and recording the possible mistreatment of the user, wherein in use when the wearable device detects possible mistreatment of the user a wireless communication is made with the hub instructing the hub to start recording the possible mistreatment of the user. The hub further sends a notification via the independent network to a non-wearer user alerting them of the possible mistreatment of the user, and allowing the non-wearer user to view the recording of the possible mistreatment of the user. When the wearable device detects a possible mistreatment incident, but is out of communication range with the hub, the microphone of the wearable device records the sound of the potential mistreatment incident. Once back in communication range of the hub, the wearable device syncs with the hub and transfers the recording of the potential mistreatment incident.

The sensors of the wearable device may comprise an accelerometer for detecting signals indicative of the user falling, violent shaking of the user, and/or sudden movement of the user.

The microphone of the wearable device may be configured to detect trigger words indicative of violence or abuse, and/or loud volume.

The wearable device may further comprise a "panic" button pressable by the user to signal the hub to start recording and notify the non-wearer user even when no triggering signals have been detected by the sensors of the wearable device.

The hub may comprise a camera and a microphone for recording incidents of possible mistreatment of the user.

The wearable device and the hub may be wirelessly connected via a Bluetooth® connection.

The hub may be connected to the independent network via a SIM card in a SIM card holder.

The non-wearer user may be notified of possible mistreatment of the user via a mobile phone.

The non-wearer user may be able to access a live feed of the hub's recording at any time.

The wearable device may be in the form of a wrist watch.

The hub may be in the form of an air freshener.

BRIEF DESCRIPTION OF THE DRAWINGS

The invention will be described, by way of example only, with reference to the drawings, in which.

DETAILED DESCRIPTION OF THE DRAWINGS

Figure 1:
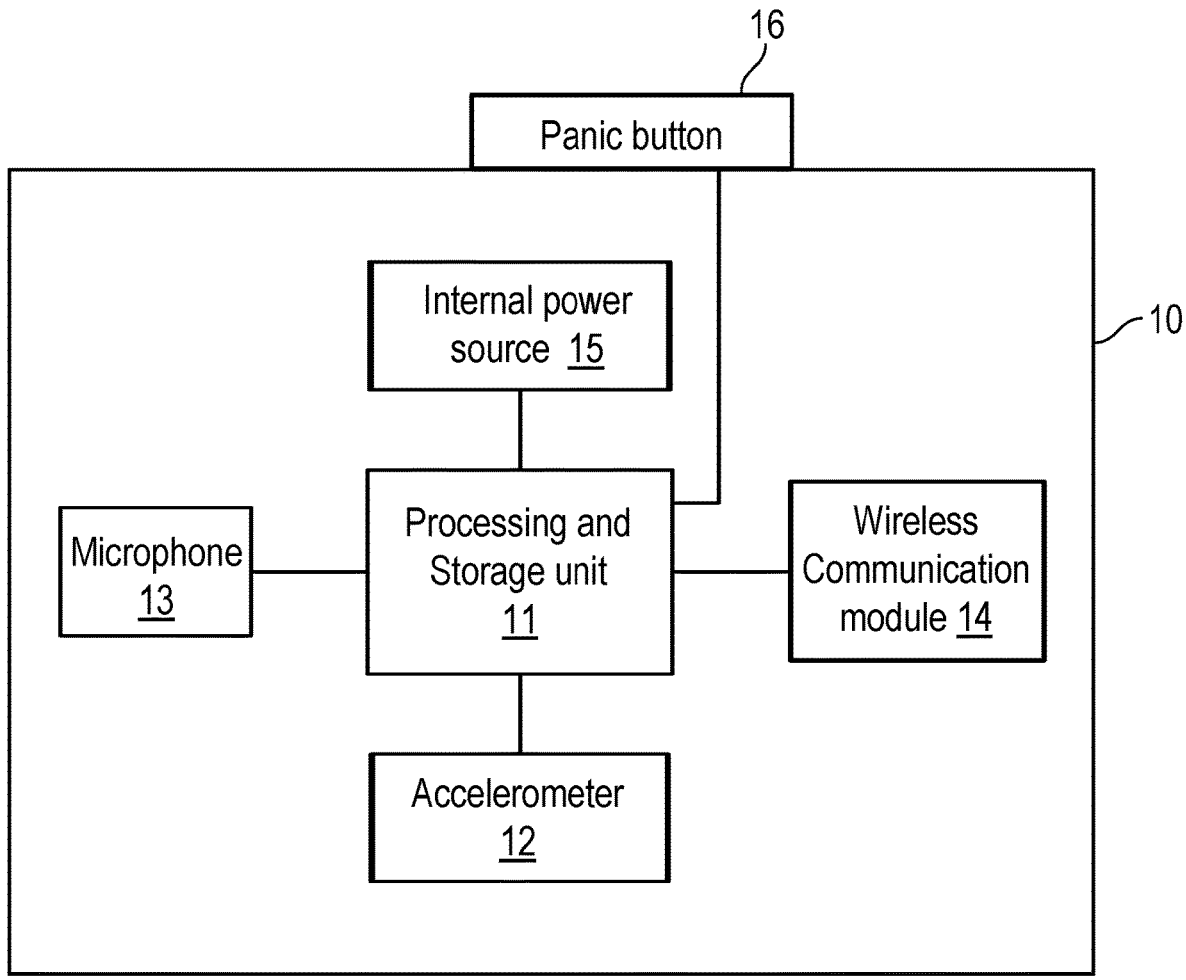
FIG. 1 depicts a schematic view of the wearable device.

FIG. 1 depicts a schematic view of the wearable device. It has an outer casing 10, within the outer casing it has a processing and storage unit 11, used for processing and storing signals sent from the sensors 12 and 13 or panic signal received from button 16 (discussed below) and controlling a wireless communication (e.g. Bluetooth®) module 14. There will also be an internal power source (e.g. a battery) 15. Accelerometer 12 will detect movement of the wearable device and therefore the user and send this to the processing unit 11 where if the movement detected registers as movement indicative of abuse, for example sudden sharp movement, violent shaking or falling, the processing unit registers this as possible abuse and then instructs the wireless communication module 14 to send an appropriate signal to the hub (discussed below). Microphone 13 detects sound in the proximity of the wearable device and therefore sound in proximity to and coming from the user, and this is sent to processing unit 11 wherein if the signal is recognised as being indicative of abuse, for example registering trigger words indicative of violence or abuse and/or a loud volume, the processing unit 11 instructs the wireless communication module 14 to send an appropriate instruction signal to the hub (discussed below).

If the wearer of the wearable device feels like they are receiving or are likely soon to receive abuse, they can press panic button 16, the pressing of the button 16 is registered by processing unit 11 and the processing unit 11 then instructs the wireless communication module 14 to send an appropriate signal to the hub (discussed below).

Figure 2:
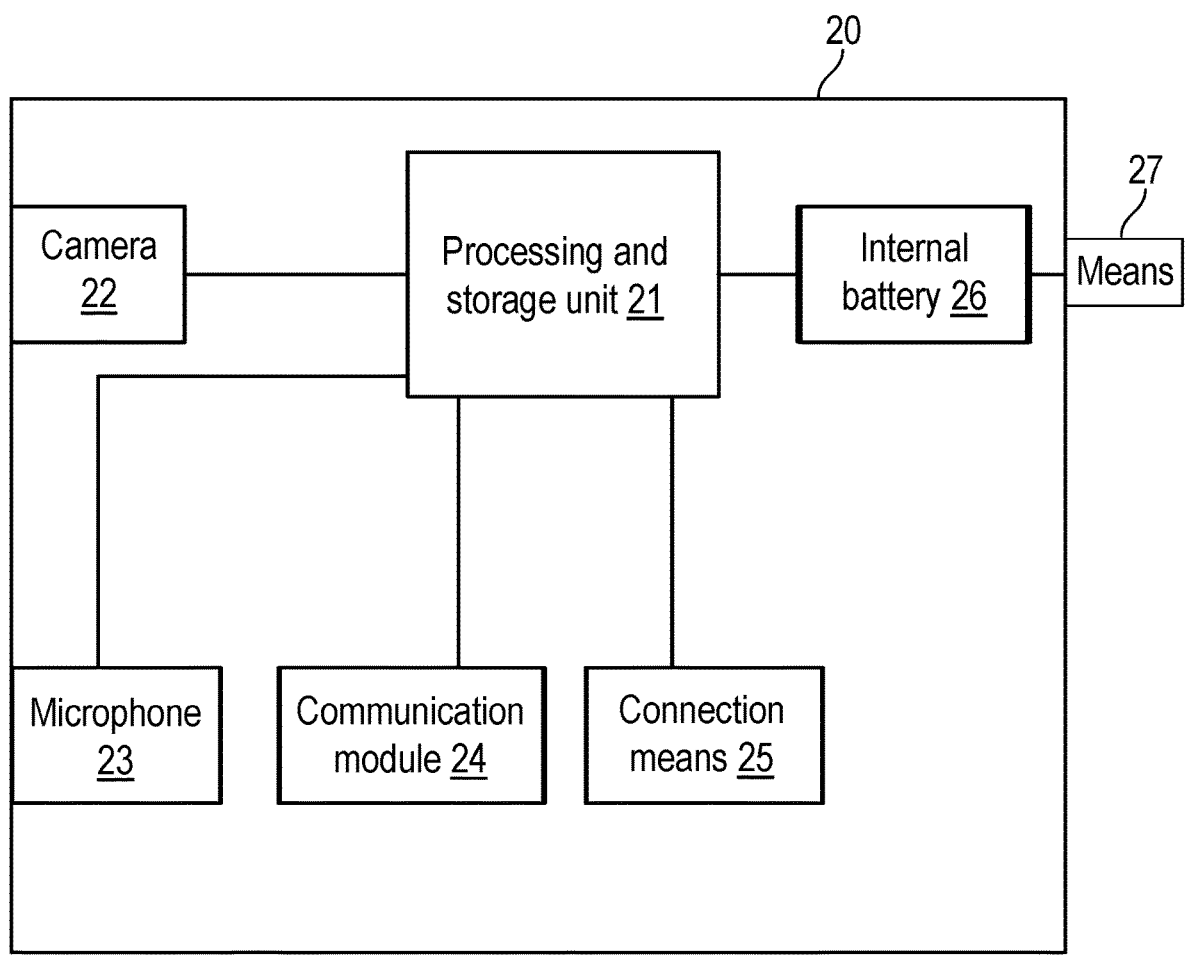
FIG. 2 depicts a schematic view of the hub device.

FIG. 2 depicts a schematic view of the hub. The hub comprises an outer casing 20. Inside the casing 20 there is a hub processing and storage unit 21, a camera 22 connected to the inside of the casing 21 and directed outward from the casing 20, and a microphone 23 positioned to record sound outside the casing 20. There is also a wireless or near field communication (e.g. Bluetooth®) module 24 for communicating with the wearable device's wireless communication module 14. The hub further comprises a connection means 25 to a wider independent network. For example, the connection means 25 may comprise a sim card holder for holding sim card so that the hub can connect by means of a mobile network to the Internet. The connection means 25 may also or alternatively comprise means to connect wirelessly to a nearby router or wi-fi service. There is also an internal battery 26 and means 27 for connecting to an external power source (e.g. mains electricity).

In use when the wearable device detects activity indicative of abuse with either sensors 12 or 13, or registers that panic button 16 has been pressed, it sends a signal from communication module 14 to hub communication module 24 instructing the hub to start recording with the camera 22 and microphone 23. The hub then, via the independent network, further sends a notification to a non-wearer user (e.g. using a mobile phone app) that there is possible abuse taking place, and allows the non-wearer user to watch the recoded video and audio or access a live feed of the video and audio in real time. The non-wearer user can also access a live feed of the video and audio from the hub at any time.

The wearable device, when out of communication range of the hub, is still active. If at this point while out of communication range it registers any potential abuse, or the pressing of panic button 16, the microphone 13 starts recording audio. This is stored in the wearable device's storage unit 11 until the wearable device is back in range of the hub, at which point the wearable device transfers the recorded audio to the hub, and the hub then sends a notification to the non-wearer user with the option to listen to the audio recorded.

Figure 3:
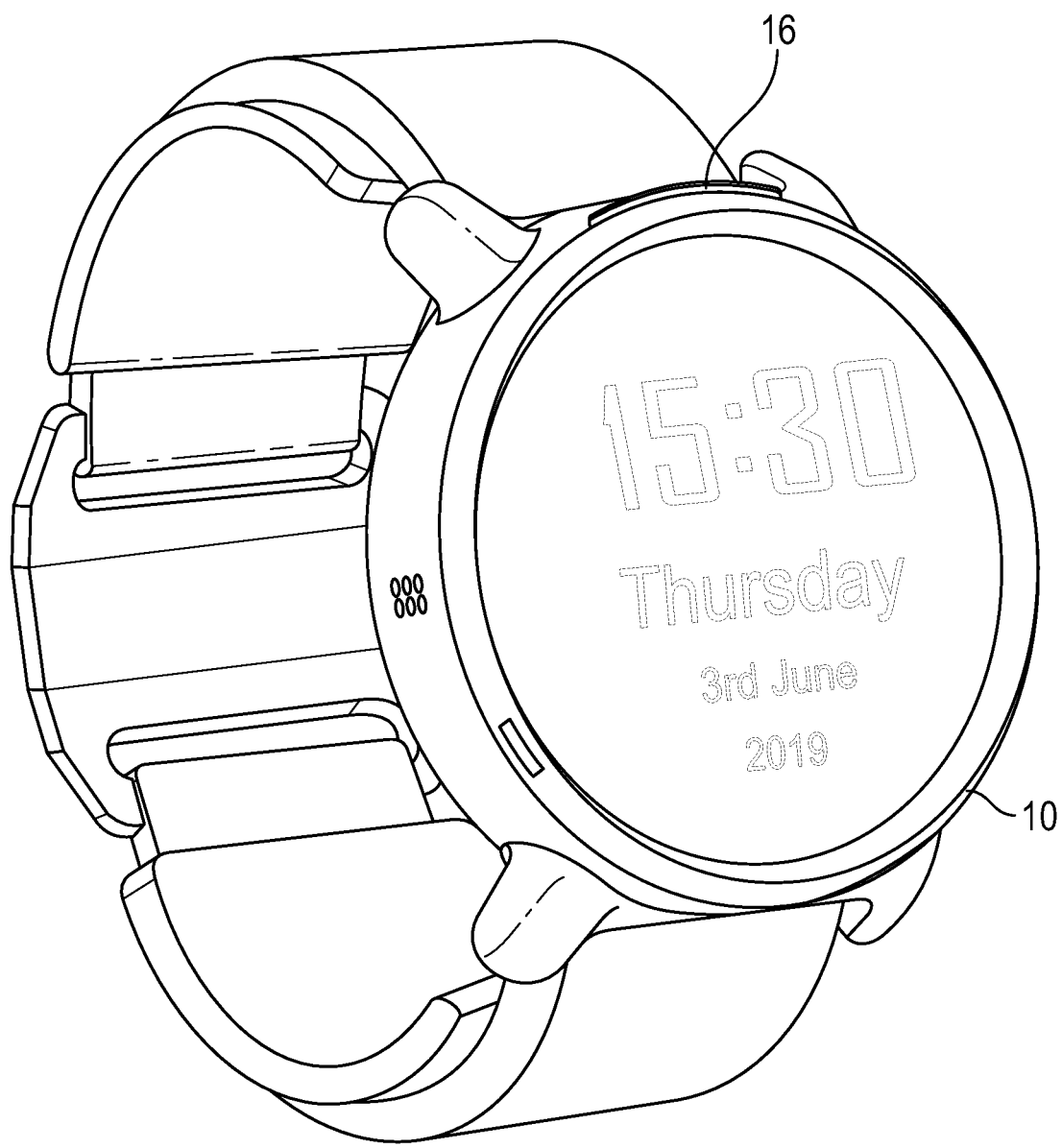
FIG. 3 depicts an example embodiment of the wearable device.

FIG. 3 depicts a possible embodiment of the wearable device. It is beneficial if non users are not aware that the monitoring system is in use, and so in order to disguise the wearable device, and for ease of wear, the wearable device is in the form of a wrist watch, with the panic button 16 being accessible on the outside of the casing 10.

Figure 4:
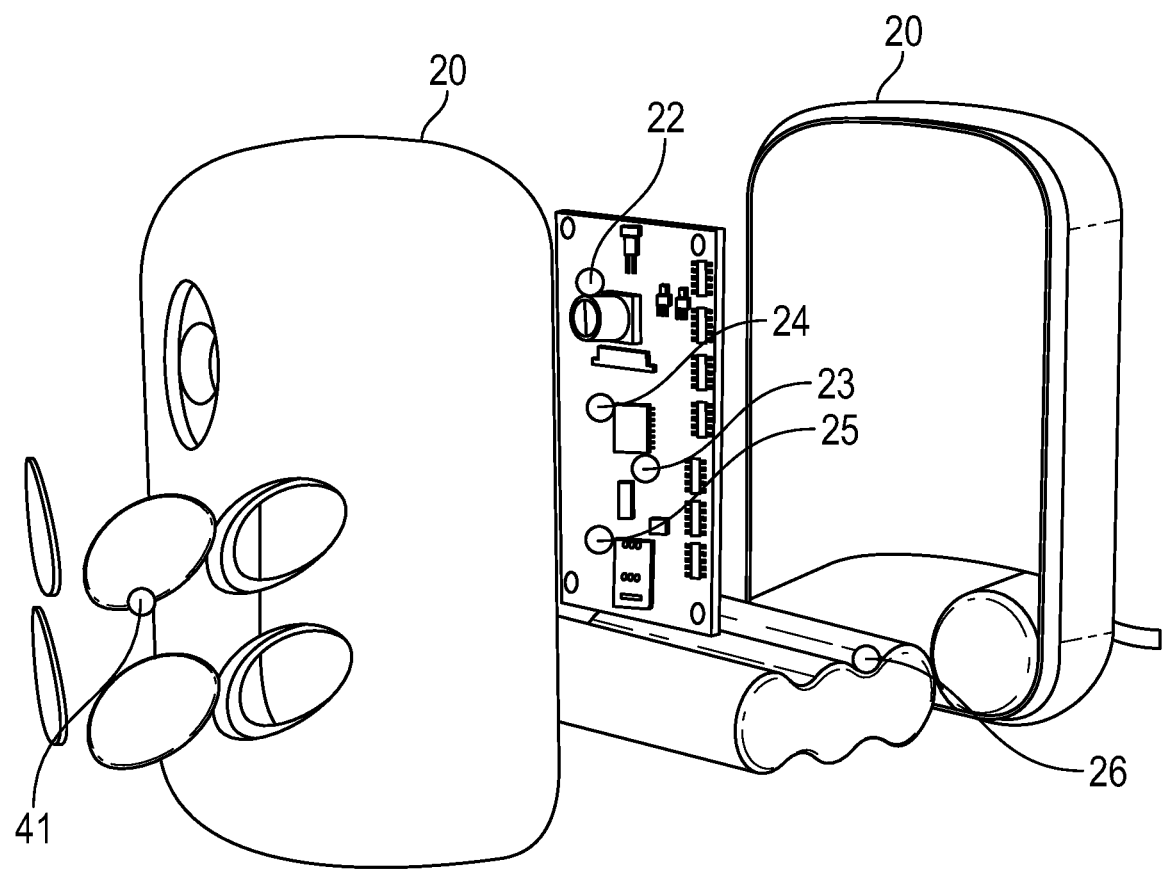
FIG. 4 depicts an exploded view of an example embodiment of the hub device.

FIG. 4 depicts an exploded example embodiment of the hub. Once again it is beneficial if non users are not aware of its presence, and therefore the hub is disguised as an air freshener so as to not stand out in a room. It has fabric petals 41 so as to allow sound to pass through easily to the microphone. There is a camera 22 to record any potential incidents. Bluetooth® chip 24 is provided for connection between the wearable device and the hub. Microphone 23 records and monitors any loud or suspicious sounds. SIM card holder 25 is provided to hold a SIM card, which in a preferred embodiment will connect to 4G to create its independent network to a mobile phone of the non-wearer user. Alternatively or additionally, a wi-fi connection may also be provided. Internal battery 26 powers the hub if it is disconnected from an external power source.

The invention has been described with reference to a preferred embodiment. The description is intended to enable the skilled person to make the invention, not to limit the scope of the invention. The scope of the invention is determined by the claims.

What is claimed is:

1. A monitoring system for gathering evidence of and generating an alert to the mistreatment of a user in care comprising: a wearable device worn by the user comprising sensors to detect signals indicative of the mistreatment of the user, the sensors including a microphone; a hub device wirelessly connected to the wearable device and with access to an independent communication network, the hub also comprising means for monitoring and recording the mistreatment of the user; configured such that, in use, when the wearable device detects the mistreatment of the user a wireless communication is made between the wearable device and the hub instructing the hub to start recording the mistreatment of the user, and the hub further sends a notification via the independent communication network to a non-wearer user alerting them of the mistreatment of the user and allowing the non-wearer user to view the recording of the mistreatment of the user; and further configured such that when the wearable device detects a mistreatment incident, but is out of communication range with the hub, the microphone of the wearable device records the sound of the mistreatment incident, and once the wearable device is back in communication range with the hub, transfers the recording of the mistreatment incident to the hub, wherein the hub then sends a notification to the non-wearer user.

2. The monitoring system according to claim 1, wherein the sensors of the wearable device comprise an accelerometer for detecting signals indicative of the user falling, violent shacking of the user, and/or sudden movement of the user.

3. The monitoring system according to claim 1, wherein the microphone is configured to detect trigger words indicative of violence or abuse, and/or loud volume.

4. The monitoring system according to claim 1, wherein the wearable device comprises a button pressable by the user to cause a signal to be sent to the hub instructing the hub to start recording and notify the non-wearer, irrespective of whether triggering signals have been detected by the sensors of the wearable device.

5. The monitoring system according to claim 1, wherein the hub comprises a camera and a microphone for recording video and audio records of incidents of the mistreatment of the user.

6. The monitoring system according to claim 1, wherein the wearable device and the hub are wirelessly connectable via a near field communication connection.

7. The monitoring system according to claim 1, wherein the hub is connectable to the independent communication network via a SIM card in a SIM card holder.

8. The monitoring system according to claim 7, wherein the non-wearer user is notified of the mistreatment of the user via a mobile phone.

9. The monitoring system according to claim 1, wherein the non-wearer user accesses a live feed of the hub's recording at any time.

10. The monitoring system according to claim 6, wherein the near field communication connection is a Bluetooth® connection.

11. The monitoring system according to claim 1, wherein the wearable device is in the form of a wrist watch.

12. The monitoring system according to claim 1, wherein the hub is in the form of an air freshener.

* * * * *